United States Patent [19]

Floyd et al.

[11] 4,182,725

[45] Jan. 8, 1980

[54] NOVEL BISPHENOL DERIVATIVES AND USES THEREOF

[75] Inventors: Joseph C. Floyd, Baytown, Tex.; Don A. Plank, Sarnia, Canada

[73] Assignee: Exxon Research & Engineering Co., Florham Park, N.J.

[21] Appl. No.: 893,204

[22] Filed: Apr. 3, 1978

Related U.S. Application Data

[60] Division of Ser. No. 779,903, Mar. 21, 1977, Pat. No. 4,101,511, which is a division of Ser. No. 711,705, Aug. 5, 1976, Pat. No. 4,032,510, which is a continuation-in-part of Ser. No. 597,245, Jul. 18, 1975, abandoned, which is a continuation-in-part of Ser. No. 441,457, Feb. 11, 1974, abandoned.

[51] Int. Cl.$^2$ .......................... C08K 5/36; C08K 5/11
[52] U.S. Cl. .................. 260/45.85 S; 260/45.85 T; 260/45.7 S; 560/140; 560/154
[58] Field of Search ................ 260/45.85 T, 45.95 R, 260/45.7 S, 45.85 S, 666.5; 560/140, 154

[56] References Cited

U.S. PATENT DOCUMENTS

| | | | |
|---|---|---|---|
| 3,157,517 | 11/1964 | Tholstrup et al. | 560/154 |
| 3,378,516 | 4/1968 | Tholstrup et al. | 560/154 |
| 3,466,323 | 9/1969 | Tholstrup et al. | 560/154 |
| 3,691,132 | 9/1972 | Brown | 260/45.95 B |

*Primary Examiner*—V. P. Hoke
*Attorney, Agent, or Firm*—C. Leon Kim; Rebecca Yablonsky

[57] ABSTRACT

Novel bisphenol condensation derivatives including polyphosphorous, polyborate, polycarbonate and polysilicate products which are capped with various capping agents such as phenoxy or alkoxy compounds are effective stabilizers for a wide spectrum of hydrocarbon polymeric materials against their thermal oxidative and photochemical degradations.

6 Claims, No Drawings

NOVEL BISPHENOL DERIVATIVES AND USES THEREOF

CROSS-REFERENCE TO RELATED APPLICATIONS

This is a division, of application Ser. No. 779,903, filed Mar. 21, 1977, now U.S. Pat. No. 4,101,511 which is a division of Ser. No. 711,705, filed Aug. 5, 1976, now U.S. Pat. No. 4,032,510 which is in turn a continuation-in-part of Ser. No. 597,245, filed July 18, 1975, which is in turn a continuation-in-part of Ser. No. 441,457, filed Feb. 11, 1974, both now abandoned.

BACKGROUND OF THE INVENTION

1. Field of the Invention

The present invention relates to novel bisphenol-derived, hydrocarbon-stabilizing agents. More particularly, it pertains to new oligomeric bisphenol derivatives, characterized by certain terminal groups, which are useful in stabilizing a wide variety of hydrocarbon polymeric materials which are subject to oxidative and ultraviolet (UV) degradations.

2. Description of the Prior Art

Most hydrocarbon polymeric materials, e.g., polyolefins, elastomers, engine fuels, waxes, lube oils and the like, are known to have oxidation or thermal degradation problems caused by the chain reaction among polymeric free radicals formed within the matrices. It has been theorized that free hydrogen radicals can react to trap the polymeric free radicals, thus stopping the chain reaction. Accordingly, most oxidation stabilizers derived from phenol or bisphenol compounds generally contain free terminal hydroxyl groups, i.e., —OH groups directly attached to phenyl rings, which can donate the hydrogen radicals needed to retard the oxidative degradation as mentioned above. Although said stabilizers containing free hydroxyl groups such as those disclosed in U.S. Pat. No. 3,510,507 (Bown et al.; 1970) are generally acceptable antioxidants, their stabilizing efficiency sometimes diminishes due to the interaction between the free hydroxyl groups and certain acid, base or metallic ions released from various sources, e.g., containers. Such loss of antioxidative effectiveness is often evidenced by early color developing in the matrices where said stabilizers have been added.

SUMMARY OF THE INVENTION

It has now been discovered that, by capping or replacing the reactive terminal hydroxyl groups with certain groups in accordance with the instant invention, one can obtain novel hydrocarbon additives which, while exhibiting all the beneficial effects of the antioxidants known to the art, can further entail the advantage of eliminating the early coloration problem discussed above. In addition to this unexpected occurrence that the bisphenol stabilizers of the instant invention, even if they are incapable of donating free hydrogen ions, are excellent oxidation stabilizers, it has further been discovered that they are also excellent stabilizers against UV degradation of various polymeric hydrocarbons.

The novel bisphenol-derived stabilizers of the instant invention having the thermal and UV stabilizing characteristics discussed above may be represented by the following structural formula:

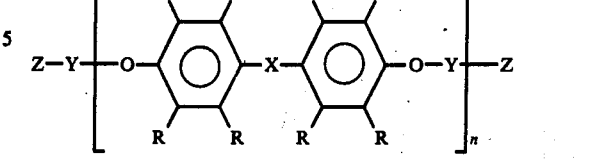  (Eq. 1)

where R, X (linking group), Y (condensing group), Z (capping group) and n have the meanings indicated below.

(1) R's, which can be either same or different, are selected from the group consisting of:
  (a) —H;
  (b) $C_1$–$C_{18}$, preferably $C_1$–$C_8$ and more preferably $C_1$–$C_4$ primary, secondary or tertiary alkyl groups; and
  (c) an aryl group.

(2) X may be selected from the group consisting of:

(a) —S—;

(b) $-\underset{R}{\overset{R}{\underset{|}{\overset{|}{C}}}}-$;

(c) —SO—;
(d) —$SO_2$—;

(e) $-\underset{}{\overset{R}{\underset{|}{N}}}-$;

(f) $-\overset{O}{\underset{}{\overset{\|}{C}}}-$;

(g) $-\overset{|}{\underset{|}{C}}-\overset{|}{\underset{|}{C}}-$; and (h) $-\overset{|}{\underset{|}{C}}-A-\overset{|}{\underset{|}{C}}-$ where A is a $C_1$–$C_{16}$ alkylene or an arylene.

(3) Y is selected from the group consisting of:

(a) $-\overset{O}{\overset{\|}{C}}-$;

(b) $-\underset{R}{\overset{}{\underset{|}{P}}}- \quad -\underset{OR}{\overset{}{\underset{|}{P}}}-, \quad -\underset{R}{\overset{O}{\underset{|}{\overset{\|}{P}}}}- \quad -\underset{OR}{\overset{O}{\underset{|}{\overset{\|}{P}}}}-;$ (c) $-\underset{OR}{\overset{}{\underset{|}{B}}}-$;

(d) $-\overset{O}{\overset{\|}{C}}-(CH_2)_m-\overset{O}{\overset{\|}{C}}-$ where m=0–10, preferably 4–8 and more preferably 4–5;

(e) 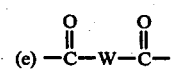

where W is —$(CH_2)_2$—S—$(CH_2)_k$—S—$(CH_2)_2$— with k=0–10, preferably 2–6 and more preferably 2–4; and

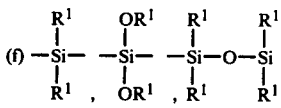

where $R^1$'s, which may be same or different, are $C_1$-$C_{10}$, preferably $C_1$-$C_4$ alkyl groups and more preferably —$CH_3$.

(4) Z is selected from the group consisting of:

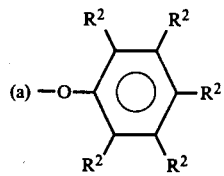

where $R^2$'s, which may be same or different, are —H, or $C_1$-$C_{18}$ alkyl groups, preferably —H or $C_1$-$C_8$ alkyl groups and more preferably —H or $C_1$-$C_4$ alkyl groups;

(b) —OH when Y is not $-\overset{O}{\underset{\|}{C}}-$; and (c) —O—$R^3$ where $R^3$ is an alkyl group having 1 to 18, preferably 1 to 6 and more preferably 2 to 4 carbon atoms.

(5) n may have a value ranging from 1 to 15, preferably 3 to 8 and more preferably 4 to 6.

Preferred stabilizers of the present invention are the bisphenol derivatives having the following structural formula:

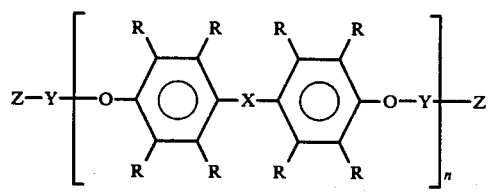
(Eq. 2)

where R, X, Y, Z and n have the same meanings as previously defined for Equation 1 except otherwise indicated below.

(1) R's, which can be either same or different, are selected from the group consisting of:
(a) —H; and (b) $C_1$-$C_{18}$, preferably $C_1$-$C_8$ and more preferably $C_1$-$C_4$ primary, secondary or tertiary alkyl groups.

(2) X is selected from the group consisting of:

(a) $-\overset{R}{\underset{R}{\overset{|}{C}}}-$;

(b) —$SO_2$—;

(c) $-\overset{O}{\underset{\|}{C}}-$;

(d) $-\overset{|}{\underset{|}{C}}-\overset{|}{\underset{|}{C}}-$; and (e) $-\overset{|}{\underset{|}{C}}-A-\overset{|}{\underset{|}{C}}-$ (3) Y is selected from the group consisting of:

(a) $-\overset{O}{\underset{\|}{C}}-$;

(b) $-\overset{O}{\underset{\|}{C}}-(CH_2)_m-\overset{O}{\underset{\|}{C}}-$ where m=0-10, preferably 4-8 and more preferably 4-5; and (c) $-\overset{O}{\underset{\|}{C}}-W-\overset{O}{\underset{\|}{C}}-$ where W is —$(CH_2)_2$—S—$(CH_2)_k$—S—$(CH_2)_2$— with k=0-10, preferably 2-6 and more preferably 2-4.

(4) Z is

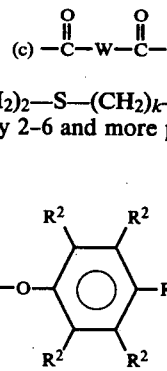

where $R^2$'s, which may be same or different, are —H, or $C_1$-$C_{18}$ alkyl groups, preferably —H or $C_1$-$C_8$ alkyl groups and more preferably —H or $C_1$-$C_4$ alkyl groups.

More preferred class of bisphenol stabilizers of the instant invention are:

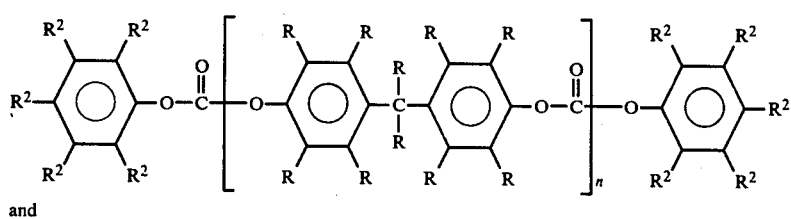
(Eq.

and

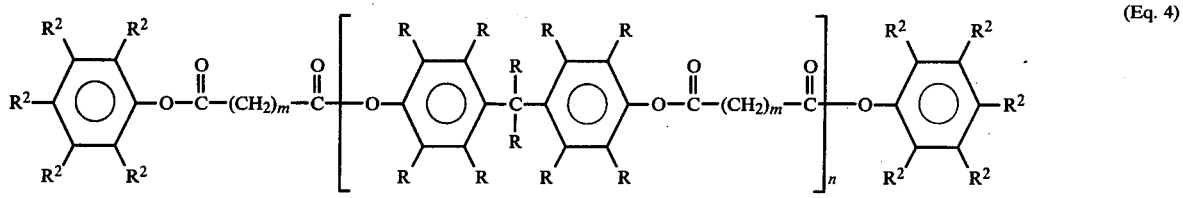

(Eq. 4)

where, R, $R^2$, n and m have the meanings as defined before.

For the purpose of the present invention, a non-capped bisphenol stabilizer is taken to mean a polybisphenol condensation product with terminal hydroxyl groups directly attached to the end phenyl rings. Thus, a capped bisphenol stabilizer may contain relatively stable terminal hydroxyl groups which are not directly attached to the terminal phenyl rings.

The novel hydrocarbon stabilizers of the present invention may be prepared by a number of known methods. For example, they can be obtained by way of condensation reactions between bisphenol compounds and acid-producing condensing agents. A capping agent may be employed either during or after the condensation reaction. Non-hindered as well as hindered bisphenol compounds can be condensed and capped to yield the desired stabilizers. Non-limiting representative of highly hindered bisphenols, e.g., bisphenols with a tertiary alkyl substituent or with more than one secondary alkyl group on each benzene ring, include: 4,4'-butylidene-bis-(3-methyl-6-t-butylphenol), 4,4'-thio-bis-(3-methyl-6-t-butylphenol), 4,4'-methylene-bis-(3-methyl-6-t-butylphenol), 4,4'-isopropylene-bisphenol, 4,4'-isopropylene-bis-(2-isopropylphenyl), 4,4'-methylene-bis-(2-methyl-6-t-butylphenyl), bis-(3-t-butyl-4-hydroxyphenyl)-sulfone and bis-(3,5-di-s-butyl-4-hydroxyphenyl)-methylamine. Example of mildly-hindered phenolic compounds, e.g., compounds having a secondary alkyl substituent on the benzene ring, are: 1,3-bis-(3-isopropyl-4-hydroxyphenyl)-propane, 1,1-bis-(2-hydroxy-5-sec-octadecylphenyl)-tridecane and (3-methyl-4-hydroxyphenyl)-(3-isopropyl-4-hydroxyphenyl)-ketone; while bis-(3,5-dimethyl-4-hydroxyphenyl)-sulfide and bis-(2,3,6-trimethyl-4-hydroxymethyl)-sulfoxide represent some of the non-hindered bisphenols containing only primary alkyl substituents amenable to the instant invention. Any of these hindered or non-hindered bisphenols may be contacted with an acid-producing condensing agent, e.g., phosgene, $(RO)PCl_2$, $(CH_2)_m(ClCO)_2$, $(RO)BCl_2$, $(RO)_2SiCl_2$, in the presence of a solvent, an acid acceptor (or remover) and a catalyst. Typically, organic bases such as aliphatic, aryl and heteroaromatic compounds, e.g., pyridine, triethylamine, piperidine and N,N'-dimethylaniline, are used as catalyst/acid acceptor. Pyridine, which can function as a solvent, catalyst and acid remover, is preferred especially when phosgene or a halide of carboxylic acid or phosphorous compound is employed as condensing agent. Suitable solvents, other than pyridine, for the condensation reaction include methylene chloride and chlorobenzene. The condensation reaction in the presence of a base catalyst/acid acceptor, e.g., pyridine, may be carried out under the atmospheric pressure and at temperatures ranging from about 0° C. to the boiling point of the reaction mixture. A typical condensation reaction may be described as follows:

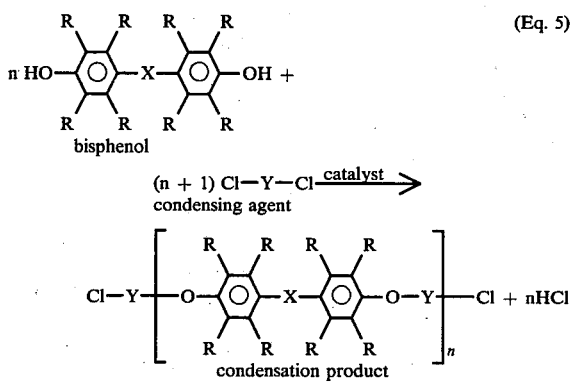

(Eq. 5)

The condensation product formed in Equation 5 may be then reacted with a capping agent. The choice of a particular capping agent is largely dependent on the stability of the condensation product. Illustrative of the capping agents emenable to the instant invention are phenol; monofunctional alkyl substituted phenols, e.g., 4-t-butylphenol, 2,4-di-t-butylphenol and p-cresol; monofunctional amines; and monofunctional $C_1-C_{18}$ alkyl alcohols. Water may also be employed as capping agent when —Y—Cl in the condensingagent as shown in Equation 5 is not

The capping may be carried out simultaneously with the condensation. In such event, the amount of the capping agent employed should be closely controlled since it can affect the condensation reaction. Because of this need to closely control the reaction, it is generally preferred to conduct the capping after a substantial completion of the condensation, by quenching the condensation product with a capping agent.

When phosgene is employed as the condensing agent, the use of water should be avoided in order to obtain the desired capped stabilizer. For the condensation product polymerized with phosgene is generally unstable and can be readily hydrolyzed to form a noncapped compound as follows:

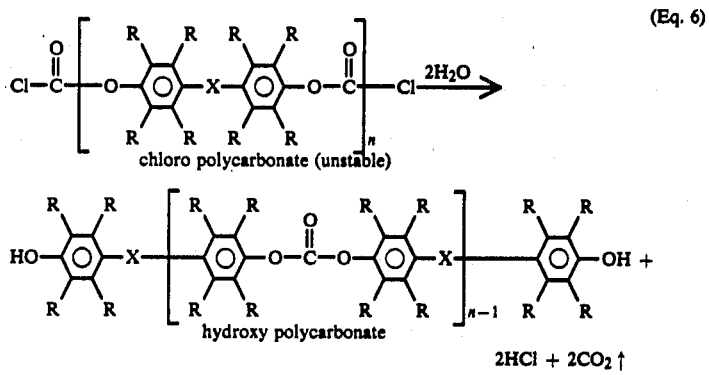
(Eq. 6)

In order to avoid the formation of an uncapped polybisphenol, i.e., polybisphenol having free hydroxyl groups directly attached to the end phenyl rings, therefore, the unstable chloro polycarbonate compound is reacted with a monofunctional alcohol or phenol to make a stable and capped polybisphenol stabilizer as follows:

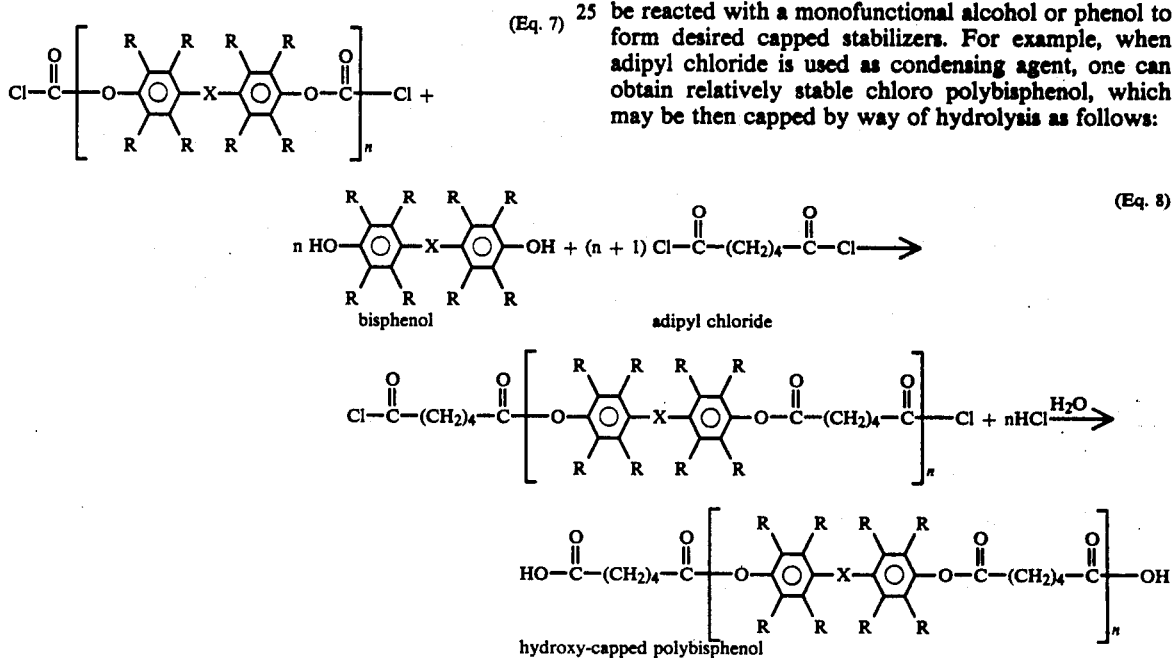
(Eq. 7)

On the other hand, when other condensing agents such as acid halides, e.g., PCl, BCl, $$ClC(CH_2)_mC-Cl,$$

are employed, the resulting condensation products, being relatively stable, can be hydrolyzed or they can be reacted with a monofunctional alcohol or phenol to form desired capped stabilizers. For example, when adipyl chloride is used as condensing agent, one can obtain relatively stable chloro polybisphenol, which may be then capped by way of hydrolysis as follows:

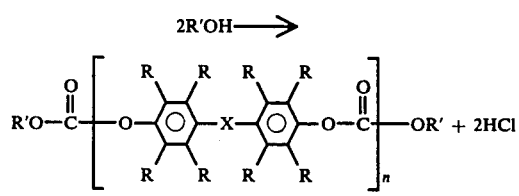
(Eq. 8)

Although the hydrolyzed polybisphenol formed in Equation 8 contains terminal hydroxyl groups, the product may be termed as a capped stabilizer within the purview of the instant invention since they are not directly attached to the phenyl rings. Preferably, however, the chloro polybisphenol compound may be capped, without hydrolysis, with a phenolic capping agent or a monofunctional alkanol.

Transesterification, or ester-interchange, is another method which may be preferably employed in obtaining the instant stabilizers. Various phenyl esters such as dipenyl carbonate, triphenyl phosphite and triphenyl borate may be employed as condensing/capping agent. Alkyl esters may also be employed although phenyl esters generally produce more satisfactory stabilizers. Typical transesterification between a bisphenol and diphenyl carbonate may be described as follows:

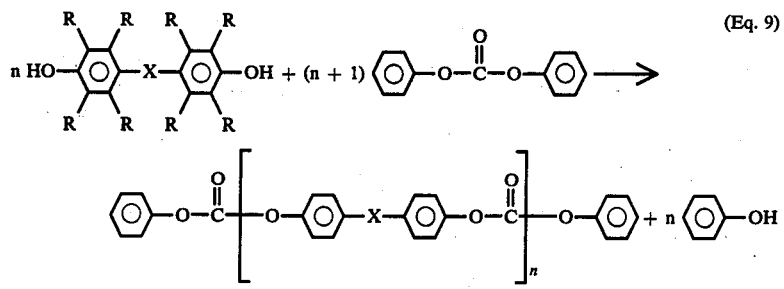

(Eq. 9)

It should be noted that the ester employed in Equation 9 functions as both condensing and capping agent. Thus, the choice of the ester determines both condensing group (Y in Equation 1) and capping group (Z in Equation 1). For example,

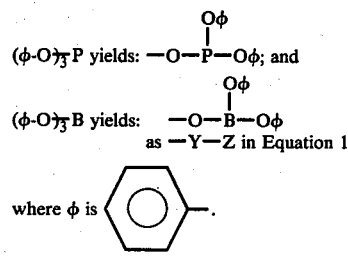

as —Y—Z in Equation 1 where φ is ⟨O⟩—.

The transesterification may be carried out in the presence of a basic catalyst such as alkali metals, e.g., sodium, potassium, or lithium; and their compounds, e.g., sodium hydroxide, sodium methoxide, potassium-t-butoxide, lithium hydride; tetra-n-butyl-ammonium hydroxide and the like. The basic catalyst is used in amounts ranging from about 0.001 to about 0.05 weight percent based on the total reactants employed. Since the transesterification such as the one described in Equation 9 is normally driven to completion by removal of phenol or similar type of reaction by-product, suitable reaction-separation conditions, e.g., temperatures ranging from about 160° to about 200° C. and a vacuum of about 1 to 2 mm. Hg may be employed. Normally, a mixture of various molecular weights of the new stabilizer is obtained from the transesterification as a clear glass which can easily be pulverized to give a white solid mixture. This solid mixture may be used as is; but purification steps may optionally be taken to improve odor and color. The preferred method of purification is to slurry the powder in a medium such as methanol which can selectively solubilize the color forming impurities and other low-molecular weight by-products contained in the product mixture; and stir the mixture at room temperature for a short time. The desired product can then be collected by filtration to give an odorless and colorless solid.

A wide variety of polymeric hydrocarbons may be effectively stabilized against thermal and/or UV degradation by employing the novel bisphenol derivatives. Such stabilizable materials may include polyolefins, particularly those polymerized from alpha-olefins using a Ziegler-type polymerization catalyst, e.g., polypropylene and polyethylene; polyvinyl chloride; elastomers; polycarbonate plastics; lubricants; fuels; naphtha, greases; waxes; petroleum resins and the like.

In order to maximize the stabilizing effect of the instant stabilizers, they are normally employed with co-synergists such as dialkyl sulfides and organic phosphites. The use of a dialkyl sulfide as co-stabilizer often produces synergistic effects against both oxidation and UV degradation; while organic phosphites are generally employed as effective co-stabilizers against UV degradation. Applicable dialkyl sulfides may be represented by the structure of $R^3$—S—$R^3$ wherein $R^3$'s, which may be either identical or different, are simple hydrocarbon moieties such as $C_nH_{2n+1}$ where n may range from 1 to about 30, preferably from 10 to 22, and more preferably from 16 to 22. However, more preferred dialkyl sulfides can be found in the widely employed thiodipropionate esters having the formula of

where $R^3$'s are the alkyl groups defined previously. Distearyl thiodipropionate, n—$C_{18}H_{37}$OCCH$_2$CH$_2$—S—CH$_2$CH$_2$CO—n—$C_{18}H_{37}$, is the most commonly used co-synergist.

Both aromatic and aliphatic phosphites can be employed as UV co-stabilizers. Specific examples include: tris-(nonylphenyl)-phosphite and Weston 618 having the structure of

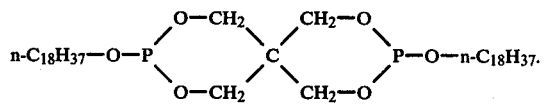

DESCRIPTION OF THE PREFERRED EMBODIMENTS

The invention will be further illustrated by the following specific examples which are given by way of illustration and not as limitations on the scope of the invention.

EXAMPLE I

This example is intended to show how a noncapped polycarbonate compound can be prepared. 9.52 g. (0.028 mole) of 2,2-bis-(4-hydroxy-3-t-butylphenyl)-propane was dissolved in 175 ml. of pyridine; and the solution was placed in a three-necked flask equipped with a mechanical stirrer, a gas inlet tube under the level of the liquid, and a condenser. 5 g. (0.051 mole) of phosgene was slowly bubbled in over a period of 30 minutes at room temperature. The reaction mixture was then stirred for additional 90 minutes whereupon the solution was poured into water. An oily semi-solid material formed, which was then separated by decanting off the aqueous layer. The oily product was dissolved in dichloromethane and the resulting solution was extracted with 5% aqueous hydrochloric acid and then water until a neutral wash was obtained. Dichloromethane was then removed by evaporation under reduced pressure to give 10.45 g. of a solid material. This material was ground into a powder, slurried in methanol and filtered. 4.42 g. of the product as a fine white powder, m.p. 210°-214° C., was collected and dried. The product mainly contained a mixture of noncapped polycarbonates having the following structure:

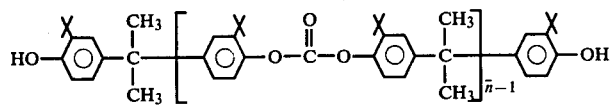

with the average degree of polymerization, $\bar{n} \simeq 10$.
*✝, hereinafter represents the tertiary alkyl group,

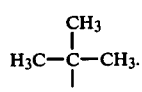

EXAMPLE II

This example is intended to show how the noncapped polycarbonate formed in Example I can be capped.

The reaction mixture of Example I was quenched by the addition of 50 ml. of methanol instead of pouring into water. The product was a tan powder, 11.25 g., m.p.=166°-172° C.

The predominant component of the product was identified as:

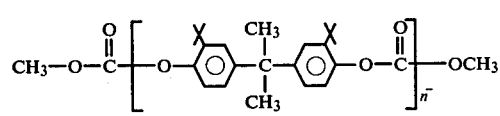

with $\bar{n} \simeq 10$.

EXAMPLE III

This example is intended to show that capping can be carried out simultaneously with condensation.

To the reaction system of Example I, 1.65 g. (0.008 mole) of 2,4-di-t-butylphenol as capping agent was added. 11.15 g. of a tan powder, m.p.=185° C., was obtained. The product was substantially identified as:

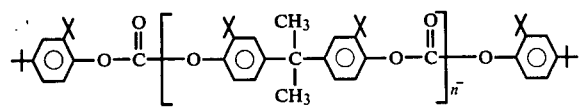

with $\bar{n} \simeq 2.6$.

EXAMPLE IV

This example, similar to Example I, is intended to show the preparation of a noncapped bisphenol compound. The noncapped compound formed in this example will be then modified or capped in the ensuing examples.

4,4'-butylidene-bis-(3-methyl-6-t-butylphenol), also known as Santowhite Powder, in an amount of 120.27 g. (0.31 mole), was dissolved in 1000 ml. of dichloromethane. 59.75 g. (0.75 mole) of pyridine was added; and the solution mixture was placed in a 2000 ml. three-necked, round-bottomed flask equipped with a mechanical stirrer, an inlet tube for gas addition and a condenser. 31.10 g. (0.31 mole) of phosgene was bubbled in over a period of 4 hours. During this time the temperature was maintained between 25° and 29° C. with an ice water bath. After the phosgene addition was done, the solution was extracted once with a 10% aqueous hydrochloric acid solution and four times with distilled water. The final wash was neutral and chloride free. The solution was concentrated to 600 mL.; and was dropped into methanol to give 110 g. of a slightly off-white colored precipitation with m.p.=155°-170° C. and average molecular weight of 4120. The product was identified predominantly as:

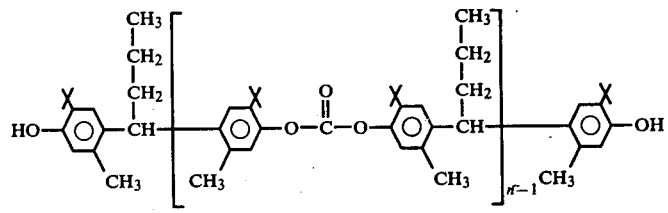

with $\bar{n} = 9.8$.

EXAMPLE V

Same as Example II except that 10.7 g. (0.028 mole) of Santowhite Powder was used as the bisphenol reactant. The product was identified predominantly as:

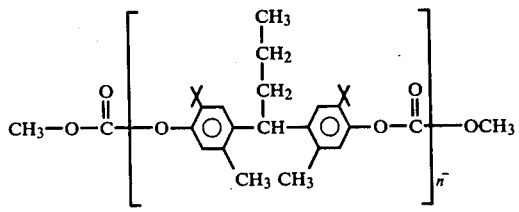

EXAMPLE VI

This example is intended to show that capping can be achieved simultaneously with condensation. 47.82 g. (0.125 mole) of Santowhite Powder and 10.32 g. (0.050 mole) of 2,4-di-t-butylphenol were dissolved in 650 ml. of dry pyridine and reacted at room temperature with phosgene until a reddish color formed in the reaction mixture. The reaction mixture was thereupon dumped into water. The gum that formed was collected by decanting off the aqueous layer. The gum was then subjected to repeated washing with distilled water until a solid precipitate formed. This product was collected by filtration, washed an additional time with water, and dried to give a very light brown powder having an average molecular weight of 1075. Analysis showed 79.74% carbon, 9.06% hydrogen, and 11.20% oxygen by weight; and the product was identified predominantly as:

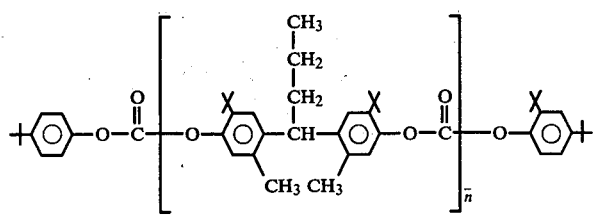

with $\bar{n} = 2.6$.

EXAMPLE VII

Examples VII–XII are intended to show that a capped polycarbonate can be synthesized by way of exchanging esters; and that the molecular weight, or degree of polymerization of the resulting polycarbonate stabilizer, can be controlled by varying the amount of the condensing/capping agent, e.g., diphenyl carbonate.

4,4'-butylidene-bis-(3-methyl-6-t-butylphenol), 20.20 g. (0.053 mole), diphenyl carbonate, 17.13 g. (0.080 mole), and lithium hydride, 0.001 g., were mixed together in a 500 ml. round-bottomed flask. The flask was placed on an all-glass rotary evaporator with the flask resting in an oil bath. The oil bath was heated to a temperature of 145° C. while the reaction mixture was subjected to 15–20 torr of pressure. As soon as the contents of the flask formed a clear melt, the vacuum was increased and the temperature was increased until the oil bath reached 180°–190° C. with a pressure of less than 1 torr. After one hour the vacuum was released and the reaction flask was removed. The reaction mixture had lost 9.05 g. in weight while the trap attached to the rotary evaporator had gained 9.05 g. in weight. Nuclear magnetic resonance (NMR) analysis showed that the material collected in the trap was 95% phenol. The material in the reaction flask solidified, upon cooling to room temperature, to form a clear glass. The glass was easily pulverized to give 28.4 g. of a pure white powder, m.p. 105°–110° C. (softening range = 58°–70° C.) and average molecular weight of 680. The product was identified predominantly as:

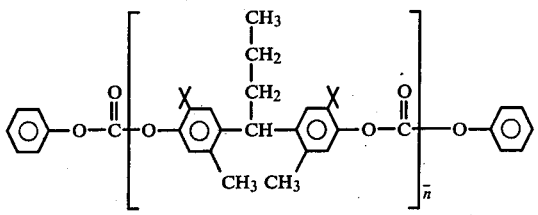

with $\bar{n} = 1.1$.

EXAMPLE VIII

Same as Example VII except that 15.24 g. (0.071 mole) of diphenyl carbonate was used. 8.38 g. of phenol was collected. The product formed a clear glass, which when pulverized formed 27.2 g. of a white powder, m.p. 161° C. (softening range = 78°–95° C.), average molecular weight of 850 and $\bar{n}$ of 1.5.

EXAMPLE IX

Same as Example VII except that 14.21 g. (0.066 mole) of diphenyl carbonate was used. 8.54 g. of phenol was collected. The product formed a clear glass, which when pulverized formed 25.9 g. of a white powder, m.p. = 217° C. (softening range = 107°–127° C.), average molecular weight of 935 and $\bar{n}$ of 1.7.

EXAMPLE X

Same as Example VII except that 13.7 g. (0.064 mole) of diphenyl carbonate was used. 10.02 g. of phenol was collected. The product formed a clear glass, which when pulverized formed 24.0 g. of a white powder, m.p. 240° C. (softening range = 131°–152° C.), average molecular weight of 1,650 and $\bar{n}$ of 3.5.

EXAMPLE XI

Same as Example VII except that 50.0 g. (0.23 mole) of diphenyl carbonate and 81.2 g. (0.21 mole) of Santowhite Powder were used. Product lost 38.48 g. phenol. The clear glass was pulverized to give a white powder, which was slurried in methanol for one hour, the filtered and dried. The resulting product had m.p. 255° C. (softened at 150° C.), average molecular weight of 1952 and $\bar{n}$ of 4.1.

EXAMPLE XII

Same as Example XI except that 54.8 g. (0.26 mole) of diphenyl carbonate was used. Product lost 38.92 g. phenol. After pulverizing and slurrying with methanol, the white powder had m.p. = 248° C. (softened at 145° C.), average molecular weight of 1650 and $\bar{n}$ of 3.5.

Examples VII to XII above show that the polymerization of the instant invention is conducted with an excess of diphenyl carbonate. Further polymerization became difficult due to the increased viscosity as the degree of polymerization went up, which made the reaction products so thick that phenol could not be removed with ease.

EXAMPLE XIII

This example is intended to show the preparation of a bisphenol stabilizer capped with hydroxy groups by first employing an excess amount of condensing agent and then hydrolyzing the intermediate condensation product.

0.10 mole of Santowhite Powder was dissolved in 200 ml. of toluene at reflux. 0.122 mole of adipyl chloride was then added slowly from a dropping funnel for about half an hour. The solution was then refluxed for one and one-half hours; and, thereafter, 0.2 mole of pyridine was added. The reaction was allowed to continue for about one and one-half hour at reflux and atmospheric pressure. The product mixture was then cooled to room temperature. Pyridinium hydrochloride was formed as precipitate, which was filtered off and discarded. The remaining solution was then hydrolyzed and continuously washed several times with a 5% HCl solution and also with distilled water. It was then dried over either $Na_2SO_4$ or $MgSO_4$; and placed on a Rinco rotary evaporator to remove any traces of the solvent. The end product, with m.p.=82°–86° C. and average M.W.=668, was recovered as a residue after evaporation. The product was identified as:

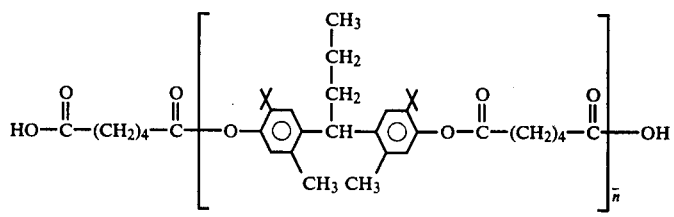

with $\bar{n}=1.1$.

EXAMPLE XIV

This example is intended to show the preparation of a phenoxy-capped bisphenol stabilizer which corresponds to the hydroxy-capped compound prepared in Example XIII.

0.10 mole of Santowhite Powder and 0.122 mole of diphenyl carbonate were mixed together in a one-liter flask. 0.1 gram of potassium-t-butoxide was also added. The flask was placed in a hot oil bath at about 190° C.; and its pressure was lowered to a vacuum. A trap was placed in the vacuum line to collect phenol released from the condensation reaction as by-product. The reaction was allowed to continue until no more phenol was captured. The flask was then cooled to room temperature; and the residue in the flask, with m.p.=150°–155° C. and average M.W.=1260, was recovered as the desired product. The product was identified as:

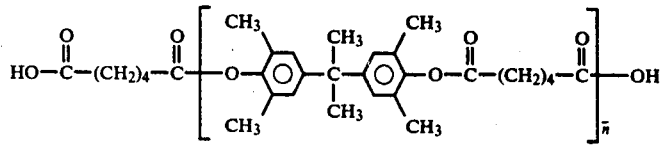

with $\bar{n}=2.5$.

EXAMPLE XV

Examples XV and XVI are intended to show the preparation of capped stabilizers from non-hindered bisphenol reactants.

Same as in Example XIII except that the bisphenol reactant employed was a non-hindered compound of the following structure:

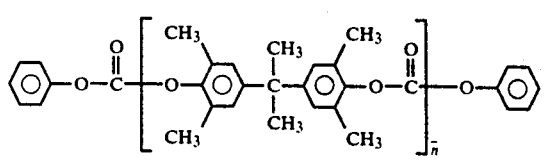

The end product was characterized as m.p.=106°–111° C. and average M.W.=1050; and identified as:

with $\bar{n}=2.3$.

EXAMPLE XVI

Same as in Example XIV except that the bisphenol of Example XV was employed as reactant.

The end product was characterized as m.p.=160°–166° C. and average M.W.=2100; and identified as:

with $\bar{n}=2.8$.

The foregoing examples illustrate the possibility of employing various methods and conditions for preparing the compositions of matter of the present invention. It is to be noted that each method must be characterized as producing a mixture of the compositions of the present invention. The term mixture is used herein to mean that the products of the foregoing examples will contain compositions of matter of the present invention which differ mainly by a difference in the number of repetitive groups and thus in molecular weight. These mixture products appear to follow a probability distribution, and as shown in the examples, are subject to change depending on the conditions, e.g., the excess amount of capping or condensing agent used. The distribution in the mixture is reproducible. The individual compositions of matter may be separated from the mixture by known methods. However, the compositions of matter are effective stabilizers even when used as mixture. The average molecular weight of the mixture products may vary within the range between about 600 and 8000 or even higher. The preferred average molecular weight of the compositions of matter of the present invention as stabilizers is between about 800 and 3000.

As previously discussed, the compositions of matter of the present invention are useful as stabilizers to retard the thermal oxidative and photochemical degradation of fats, lubricants and high molecular weight polyolefins. The stabilizers of the present invention are added to the materials to be stabilized in amounts from about 0.01 to about 1.5 percent by weight. The compositions of matter of the present invention are especially effective in stabilizing high molecular weight polymers, e.g., polyolefins, against thermal oxidative and photochemical degradations where there is also added a dialkyl sulfide costabilizer such as exemplified by dilauryl thiodipropionate, distearyl thiodipropionate and diabietyl thiodipropionate.

Additional photochemical stabilization towards ultraviolet may be obtained by adding an organic phosphite, with or without a dialkyl sulfide, to the polymeric medium. The organic phosphite can be selected from either a tris-(alkylated-phenyl)-phosphate, e.g., tris-(nonylphenyl)-phosphite; or a dialkyl-pentaerythritol-diphosphite, e.g., didodecyl-pentaerythritol-diphosphite.

The compositions of matter of the present invention when used as stabilizers for high molecular weight polymers, e.g., polyolefins, are used in amounts from about 0.01 to about 1.0 weight percent based on the polymer to be stabilized. Preferably, the polymers are stabilized by employing the novel capped stabilizer in an amount ranging from about 0.05 to about 0.20 percent by weight. The dialkyl sulfides are used in amounts from about 0.05 to about 1.0 percent by weight with a preferred amount from about 0.1 to about 0.5 percent by weight. The organic phosphites are used in amounts from about 0.01 at about 1.0 percent by weight with a preferred amount from about 0.05 to about 0.20 by weight.

The polyolefin polymers stabilized or treated in accordance with the present invention may be illustrated by those produced by the high pressure, low pressure, or Ziegler-type polymerization process. The polyolefin polymers are exemplified by polymers of alpha-olefins having 2 to 8 carbon atoms in the molecule and may be illustrated by polyethylene, polypropylene, ethylenepropylene copolymers, ethylenebutene-1 copolymers, ethylenepentene-1 copolymers and the like, having molecular weights in the range from about 10,000 to about 1,000,000. The polymers which are specifically illustrated for treatment in accordance with the present invention were produced by polymerization of the corresponding olefins employing the Ziegler-type polymerization catalyst.

In employing the compositions of matter of the present invention, they may suitably be added to a polyolefin in a solution of an aromatic hydrocarbon. The solution may be sprayed over the pellets or particles of the polyolefin and the resulting mixture then extruded through a suitable extrusion device to form a homogeneous mixture. The compositions of matter may also be added as a dry solid where the compositions of matter so exist. After adding the compositions of matter of the present invention to the polymer particles, the resulting mixture may be milled or extruded or passed through other mixing devices to intimately admix the polymer particles with the solid compositions of matter of the present invention to form a homogeneous mixture. The dialkyl sulfides and organic phosphites employed may also be added to the polymer particles in a manner similar to that of the addition of the compositions of matter of the present invention.

To illustrate the stabilizing efficiency of the compositions of matter of the present invention, they were incorporated into polypropylene. The samples were prepared by dry blending the compositions with polypropylene powder containing a small amount (0.04–0.06 wt. %) of the processing stabilizer butylated hydroxytoluene (BHT). The composites were then extruded and pelletized.

To illustrate the thermal oxidative stabilizing efficiency of the compositions of matter of the present invention, the composite pellet samples were compression molded into 50 mil plaques and aged in a forced air circulating Freas oven in accordance with the ASTM method D 3012-72 for evaluating the thermal oxidative stability of propylene plastics. These tests were carried out at 150° C. and the days to failure of the test specimen determined. Failure was defined as visual of localized discoloration or crumbling on any part of the specimen directly exposed to the air flow.

To illustrate the photochemical stabilizing efficiency of the compositions of matter towards the degradative effects of ultraviolet light, the composite peller samples were extruded into 6-mil monofilament and aged in an Atlas Xenon Arc-Type Weatherometer in accordance with the ASTM method D-2565-70, procedure B. Failure of these specimens was defined as the number of hours to degrade to 50% retention of the original tenacity.

The thermal oxidative stability data for the compositions of matter of the present invention incorporated in polypropylene are summarized in Tables I, II, and III and IV. The data of Table I illustrate the effectiveness of the compositions of matter of the present invention when used with a secondary stabilizer or costabilizer, the combination giving a synergistic effect. The costabilizer used in the test was distearyl thiodipropionate (DSTDP). The data further illustrate the effectiveness of the compositions in combination with DSTDP when compared with two commercially accepted phenolic stabilizers, i.e., tris-(3,5-di-t-butyl-4-hydroxybenzyl)-isocyanurate and pentaerythryl-tetra-(3,5-di-t-butyl-4-hydroxyhydrocinnamate).

The data of Table II illustrate the increasing effectiveness of the novel stabilizers of the instant invention, which tendency parallels the increase in their molecular weights.

The data of Table III illustrates the effect of end groups on the stabilizing effectiveness of the compositions of matter of the present invention: the stabilizers with aromatic terminal groups such as 2,4-di-t-butyl-phenol (#4429 and #4427) are more effective than those with low-molecular weight alkoxy capping groups (#4432 and #4435); and are comparable or better than the noncapped stabilizers (#4431 and #4164).

The data of Table IV illustrate that both phenoxy-capped stabilizers and certain hydroxy-capped stabilizers produce comparably good antioxidative results; and that excellent hydrocarbon stabilizers can be derived from certain non-hindered bisphenols, i.e., bisphenols with only primary alkyl substituents.

The data of Table V illustrate the excellent stability towards photochemical degradation imparted by the compositions of matter of the present invention to polypropylene.

TABLE I
THERMAL OXIDATIVE STABILITY OF STABILIZED POLYPROPYLENE

| Stabilizer System | Weight Percent | Oxidative Stability Days |
|---|---|---|
| None | — | 1 |
| Distearyl thiodipropionate (DSTDP) | 0.25 | 1 |
| 4,4'-butylidene-bis-(3-methyl-6-t-butylphenol) | 0.10 | 1 |
| Tris-(3,5-di-t-butyl-4-hydroxybenzyl)-isocyanurate | 0.10 | 2 |
| Pentaerythryl-tetra-3,5-di-t-butyl-4-hydroxyhydrocinnamate | 0.10 | 35 |
| Example XI | 0.10 | 1 |
| DSTDP, 4,4'-butylidene-bis-(3-methyl-6-t-butylphenol) | 0.25, 0.10 | 15 |
| DSTDP, tris-(3,5-di-t-butyl-4-hydroxybenzyl)-isocyanurate | 0.25, 0.10 | 108 |
| DSTDP, pentacrythryl-tetra-3,5-di-t-butyl-4-hydroxy-hydrocinnamate | 0.25, 0.10 | 126 |
| DSTDP, Example XI | 0.25, 0.10 | 131 |

TABLE II
THERMAL OXIDATIVE STABILITY OF POLYPROPYLENE

| Sample No. | Stabilizer System | Weight Percent | Oxidative Stability, Days | MW |
|---|---|---|---|---|
| 4546 | DSTDP, Example VII | 0.25, 0.10 | 51 | 680 |
| 4547 | DSTDP, Example VIII | 0.25, 0.10 | 67 | 850 |
| 4548 | DSTDP, Example IX | 0.25, 0.10 | 98 | 935 |
| 4566 | DSTDP, Example XII | 0.25, 0.10 | 118 | 1650 |
| 4654 | DSTDP, Example XI | 0.25, 0.10 | 131 | 1952 |

TABLE III
THERMAL OXIDATIVE STABILITY OF POLYPROPYLENE

| Sample No. | Stabilizer System | Weight Percent | Oxidative Stability, Days |
|---|---|---|---|
| 4431 | DSTDP, Example I | 0.25, 0.10 | 108 |
| 4432 | DSTDP, Example II | 0.25, 0.10 | 17 |
| 4429 | DSTDP, Example III | 0.25, 0.10 | 112 |
| 4164 | DSTDP, Example IV | 0.25, 0.10 | 93 |
| 4435 | DSTDP, Example V | 0.25, 0.10 | 10 |
| 4427 | DSTDP, Example VI | 0.25, 0.10 | 108 |

TABLE IV
THERMAL OXIDATIVE STABILITY OF POLYPROPYLENE WITH ADDITIVES*

| Stabilizer System | Days to Failure at 150° C. |
|---|---|
| DSTDP, Example XIII | 130 |
| DSTDP, Example XIV | 108 |
| DSTDP, Example XV | 144 |
| DSTDP, Example XVI | 161 |

*Tested in 50 mil plaques of polypropylene containing 0.10 wt. % of the synthesized antioxidant and 0.30 wt. % distearyl thiodipropionate in each of the four runs.

TABLE V
PHOTOCHEMICAL STABILITY OF POLYPROPYLENE

| Sample No. | Stabilizer System | Weight Percent | Hours to 50% Retention of Tenacity |
|---|---|---|---|
| 3580 | None | — | 250 |
| 4705 | DSTDP, Example XII | 0.30, 0.10 | 1040 |
| 4707 | DSTDP, Example XI | 0.30, 0.10 | 1100 |
| 4706 | DSTDP, Example XII, Distearyl pentaerythritol diphosphite | 0.30, 0.10, 0.10 | 1100 |
| 4708 | DSTDP, Example XI, Distearyl pentaerythritol diphosphite | 0.30, 0.10, 0.10 | 1200 |

What is claimed is:

1. A composition of matter having the following structural formula:

$$Z-Y\left[-O-\underset{R}{\overset{R}{\underset{|}{\bigcirc}}}-X-\underset{R}{\overset{R}{\underset{|}{\bigcirc}}}-O-Y\right]_n Z$$

wherein:
(1) R is selected from the group consisting of —H, $C_1$–$C_{18}$ alkyl groups, and an aryl group;
(2) X is selected from the group consisting of —S—, $$-\underset{R}{\overset{R}{\underset{|}{C}}}-,\ -SO-,\ -SO_2-,\ -\overset{R}{\underset{|}{N}}-,\ -\overset{O}{\underset{}{\overset{\|}{C}}}-,\ -\underset{|}{\overset{|}{C}}-\underset{|}{\overset{|}{C}}-,$$

and $-\underset{|}{\overset{|}{C}}-A-\underset{|}{\overset{|}{C}}-$ wherein A is a $C_1$-$C_{16}$ alkylene or an arylene group;

(3) Y is

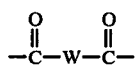

where W is —$(CH_2)_2$—S—$(CH_2)_k$—S—$(CH_2)_2$— and wherein k ranges from 0 to 10;

(4) Z is selected from the group consisting of

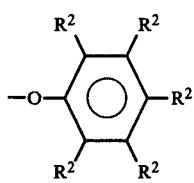

wherein $R^2$ is —H or a $C_1$-$C_{18}$ alkyl group, —OH, and $OR^3$ and $R^3$ is a $C_1$-$C_{18}$ alkyl group, and (5) n is a value ranging from 1 to about 15.

2. The composition according to claim 1 wherein R is selected from the group consisting of —H and $C_1$-$C_{18}$ alkyl groups.

3. The composition according to claim 1 wherein X is

4. The composition according to claim 1 wherein Z is

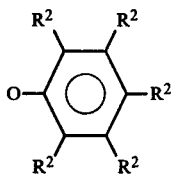

wherein $R^2$ is selected from the group consisting of —H and $C_1$-$C_{18}$ alkyl groups.

5. A composition of matter comprising an oxidatively degradable organic material selected from the group consisting of polyolefins, polyvinyl chloride, elastomers, polycarbonate plastics, lubricants, fuels, naptha, greases, waxes and petroleum resins having the following structural formula:

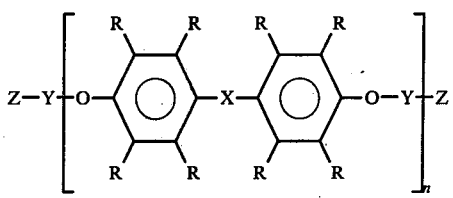

wherein:

(1) R is selected from the group consisting of —H, $C_1$-$C_{18}$ alkyl groups, and an aryl group;

(2) X is selected from the group consisting of

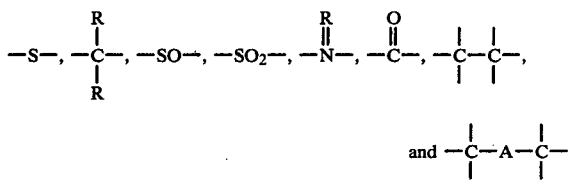

wherein A is a $C_1$-$C_{16}$ alkylene or an arylene group;

(3) Y is

wherein W is —$(CH_2)_2$—S—$(CH_2)_k$—S—$(CH_2)_2$— and wherein k ranges from 0 to 10;

(4) Z is selected from the group consisting of

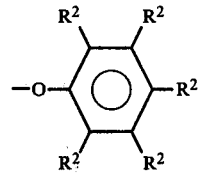

wherein $R^2$ is —H or a $C_1$-$C_{18}$ alkyl group, —OH, and $OR^3$ and $R^3$ is a $C_1$-$C_{18}$ alkyl group; and (5) n is a value ranging from 1 to about 15.

6. The composition according to claim 5 which comprises an effective amount of a co-stabilizer selected from the group consisting of dialkyl sulfides having the structural formulas of $R^3$—S—$R^3$ and $R^3$

wherein $R^3$ is a $C_1$-$C_{30}$ alkyl group.

* * * * *